United States Patent
Goldstein et al.

(10) Patent No.: US 9,815,166 B2
(45) Date of Patent: Nov. 14, 2017

(54) INSPECTION DEVICE FOR MECHANICAL INSTRUMENTS AND USES THEREOF

(71) Applicants: Mike Goldstein, Herzlia (IL); Yarden Goldstein, Herzlia (IL)

(72) Inventors: Mike Goldstein, Herzlia (IL); Yarden Goldstein, Herzlia (IL)

( * ) Notice: Subject to any disclaimer, the term of this patent is extended or adjusted under 35 U.S.C. 154(b) by 526 days.

(21) Appl. No.: 14/370,789

(22) PCT Filed: Jan. 3, 2013

(86) PCT No.: PCT/IL2013/050009
§ 371 (c)(1),
(2) Date: Jul. 7, 2014

(87) PCT Pub. No.: WO2013/102900
PCT Pub. Date: Jul. 11, 2013

(65) Prior Publication Data
US 2015/0009321 A1 Jan. 8, 2015

Related U.S. Application Data

(60) Provisional application No. 61/582,833, filed on Jan. 4, 2012.

(51) Int. Cl.
*B23Q 17/24* (2006.01)
*G06K 9/46* (2006.01)
*G06K 9/78* (2006.01)
*G06Q 10/08* (2012.01)
*G06T 7/00* (2017.01)

(52) U.S. Cl.
CPC ..... *B23Q 17/2457* (2013.01); *B23Q 17/2404* (2013.01); *B23Q 17/2409* (2013.01); *B23Q 17/249* (2013.01); *G06K 9/4604* (2013.01); *G06K 9/78* (2013.01); *G06Q 10/087* (2013.01);
(Continued)

(58) Field of Classification Search
CPC .... B23Q 17/2457; B23Q 17/249; G06K 9/78; G06K 9/4604; G06Q 10/087
See application file for complete search history.

(56) References Cited

U.S. PATENT DOCUMENTS 4,845,763 A * 7/1989 Bandyopadhyay .... G01B 11/24
348/135
4,869,813 A * 9/1989 Bailey ................... B07C 5/3422
209/538

(Continued)

FOREIGN PATENT DOCUMENTS

| DE | 4040609 | 6/1992 |
| EP | 2322077 | 5/2011 |
| WO | 2009046781 | 4/2009 |

OTHER PUBLICATIONS

Chacon et al., (2006) Heat production by 3 implant drill systems after repeated drilling and sterilization. J Oral Maxillofac Surg 64(2): 265-9.
(Continued)

*Primary Examiner* — Jay Patel
*Assistant Examiner* — Irfan Habib
(74) *Attorney, Agent, or Firm* — The Roy Gross Law Firm, LLC; Roy Gross

(57) ABSTRACT

Devices and methods for inspection of various mechanical instruments to determine their level of wear and re-usability, particularly surgical and dental instruments, are provided.

16 Claims, 15 Drawing Sheets

(52) U.S. Cl.
CPC .. *G06T 7/0004* (2013.01); *G06T 2207/10004* (2013.01); *G06T 2207/30164* (2013.01)

(56) References Cited

U.S. PATENT DOCUMENTS

| | | | |
|---|---|---|---|
| 4,900,252 A | | 2/1990 | Liefke |
| 5,208,761 A | | 5/1993 | Michigami |
| 5,255,199 A | * | 10/1993 | Barkman ............... B23Q 17/09 348/94 |
| 5,361,308 A | | 11/1994 | Lee |
| 5,374,813 A | | 12/1994 | Shipp |
| 5,619,783 A | * | 4/1997 | Yasuhira ............ B23Q 17/2457 29/407.04 |
| 5,926,558 A | * | 7/1999 | Zelt, III ............... B23D 35/007 348/130 |
| 6,099,522 A | * | 8/2000 | Knopp .................. B23K 26/04 606/10 |
| 6,161,055 A | * | 12/2000 | Pryor ................. G05B 19/4065 382/152 |
| 6,633,379 B2 | | 10/2003 | Roesner |
| 6,877,984 B2 | | 4/2005 | Tinnin |
| 7,266,420 B2 | * | 9/2007 | Budd ................ B23Q 17/0909 382/152 |
| 7,403,872 B1 | * | 7/2008 | St. Onge ................ B07C 5/08 324/237 |
| 8,256,126 B2 | * | 9/2012 | Esaka ............... B23Q 17/2457 33/502 |
| 8,768,048 B1 | * | 7/2014 | Kwatra .................. G06K 9/72 382/159 |
| 8,881,354 B2 | * | 11/2014 | Nakamura ........ B23B 29/03421 29/26 R |
| 9,188,437 B2 | * | 11/2015 | Kurahashi .......... B23Q 17/2409 |
| 9,610,667 B2 | * | 4/2017 | Samukawa ........ B23Q 17/2457 |
| 2002/0186370 A1 | * | 12/2002 | Roesner ................ B23Q 17/09 356/301 |
| 2004/0122459 A1 | * | 6/2004 | Harp .................. A61B 1/00165 606/171 |
| 2005/0253863 A1 | * | 11/2005 | Mitchell .................. G06K 9/34 345/582 |
| 2006/0286506 A1 | | 12/2006 | Birnholtz |
| 2007/0028734 A1 | * | 2/2007 | Sekiya ................... B26D 5/007 83/72 |
| 2008/0030345 A1 | * | 2/2008 | Austin .................. A61B 90/98 340/572.8 |
| 2009/0129882 A1 | * | 5/2009 | Tchouprakov ..... A61C 13/0009 409/131 |
| 2009/0322541 A1 | | 12/2009 | Jones |
| 2011/0064302 A1 | * | 3/2011 | Ma ..................... G06K 9/00275 382/159 |
| 2011/0075938 A1 | * | 3/2011 | Singhal ................ G06T 7/0014 382/224 |
| 2011/0243434 A1 | * | 10/2011 | Cao .......................... G06K 9/48 382/165 |
| 2012/0038763 A1 | * | 2/2012 | Kawada ................ B23B 25/06 348/95 |
| 2017/0165797 A1 | * | 6/2017 | Nii .......................... B23P 15/32 |

OTHER PUBLICATIONS

Lea (2008) Cavitation damage to ultrasonic scalers. Dental Health 47(2): 5-8.

Lea et al., (2006) The effect of wear on ultrasonic scaler tip displacement amplitude. J Clin Periodontol 33(1): 37-41.

Srinivasan and Shobha (2008) Statistical texture analysis. Proceedings of World Academy of Science, Engineering and Technology 36: 1264-1269.

* cited by examiner

INSPECTION DEVICE FOR MECHANICAL INSTRUMENTS AND USES THEREOF

FIELD OF THE INVENTION

The present invention relates to devices and methods for inspection of various mechanical instruments, particularly surgical and dental instruments.

BACKGROUND OF THE INVENTION

Dental treatments are mostly performed through the use of various drilling buns, also termed dental burrs, which penetrate tissue structures, such as tooth enamel and dentin, as well as bone and soft tissue. Such dental burrs are mainly used for cutting through the tissue structure, and shaping and polishing restorations materials. Sharp burrs ensure fast working time, less pain to the patient and lower vibration sensation.

Most buns are intended for multiple uses and are sterilized between patients. However, the burrs tend to wear after repeated use. Replacing the bun during a dental procedure is time consuming and bothering, for both patient and dentist. In addition, it is difficult to assess when a bun should be replaced.

Additional dental instruments that are intended for multiple uses and tend to wear include dental scalers, including ultrasonic dental scalers, implant drills, curettes, probes and explorers.

For example, during clinical procedures, ultrasonic scaler tips may become worn and reduced in length. Tip wear could affect the performance of dental ultrasonic scaler inserts by reducing their vibration displacement amplitude (see, for example, Lea et al. (2006) *J Clin Periodontol.,* 33(1):37-41). In addition, it has been reported that cavitational activity occurs in distinct areas along the length of the ultrasonic scaling tip, which is powerful enough to produce wear of the metallic surface (Lea et al. (2008) *Dental Health,* 47; 5-8).

As another example, it has been shown that used implant drills cause an increase in bone temperature during osteotomy (see, for example, Chacon et al. (2006) *J Oral Maxillofac Surg.,* 64(2):265-9). The rise in bone temperature has a negative impact on bone tissue and the outcome of the implant procedure. Using a proper implant drill may decrease bone temperature rise during osteotomy, thus reducing thermal injury.

As a further example, dental explorers and probes, which are routinely used during dental examination for identification of caries, may become dull. A dull explorer tip may result in false-negative diagnosis.

As a further example, repeated use of instruments such as scalers and curettes wears away minute particles of metal from the blade, causing their edge to take on a rounded shape resulting in a dull, ineffective blade. Scaling and root planing are most effective when using sharp instruments. When the blade is dull, a clinician may lose the ability to "feel" the sharp edge "grabbing" onto a surface. It may then seem that the blade is sliding over the surface or deposit, which causes the clinician to work harder to remove deposits. This may result in burnishing rather than removing the deposit.

Thus, there is a need to determine the condition of dental instruments and the level of wear prior to or during their operation.

A common suggested method to determine sharpness of various dental tools is by using the Hard Plastic Test Stick. In this test, the sharpness of an instrument is measured by gliding it on the test stick. A sharp edge will "grab" the test stick and the test stick will produce a metallic clicking sound. A dull edge will slip or slide over the surface of the test stick. Another common way to test the sharpness of an instrument is to inspect the blade visually.

U.S. Pat. No. 5,208,761 discloses a method for the confirmation of the diameters of plural drills of different diameters in a PWB (printed wiring board) working machine in which the drills are interchangeably mounted to perform drilling The method comprises storing, with respect to each of the drills, data on whether or not the drill has already been used, checking the data of one of the drills upon drill replacement, and measuring the diameter of the drill only where the drill has not previously been used.

U.S. Pat. No. 6,877,984 discloses a device for cleaning endodontic files and indicating flaws in endodontic files comprising a foam core contained in a housing and a covering overlaying the core through which a file is inserted into the device. A method for cleaning endodontic files using the device comprises the steps of inserting a file into the device and withdrawing the file. A method for detecting flaws in a file, includes the steps for cleaning the file and then examining the file for debris from the endodontic procedure adhering to the file which indicates the presence and location of damage to the file.

US 2006/0286506 discloses a method of making and using a dental tool that is recommended to be reused a certain number of times, with markings on the shaft of the tool that correspond in number to the number of recommended uses of the tool. A visually perceptible marking, such as paint or ink may be applied to annular recesses or to a portion of the shaft surface that is not recessed. One of the markings is removed from the shaft of the tool prior to reusing the tool. The dental tool disclosed in US 2006/0286506 has a cutting element and a shaft that is provided with a plurality of deposits or indicators applied to the shaft.

US 2009/0129882 relates to methods, systems, and devices for monitoring tool breakage and wear in a dental milling machine. US 2009/0129882 discloses, inter alia, a dental milling system which includes a milling tool for milling a dental prosthetic and a spindle operable to receive, fixedly engage, and rotate the milling tool. A first accelerometer is positioned adjacent to the spindle and is operable to detect vibrations associated with rotation of the milling tool. A processor is in communication with the first accelerometer to receive data sets representative of the vibrations detected by the first accelerometer. The processor processes the data sets to identify changes in one or more harmonics of the detected vibrations indicative of a break of the milling tool.

US 2009/0322541 discloses a performance sensor, and more particularly, a performance sensor for a handheld dental drill. Operation of a handpiece is sensed, such as by detecting temperature and/or vibration associated with one or more of bearing rings supporting a turbine in the hand piece. When operation exceeds a threshold, a visual or audible indication is provided, and power to the turbine may be interrupted. The sensor(s) may be built into the hand piece, or be part of a removable girdle placed on the handpiece. Typically, the hand piece is used for dental or medical applications.

There still remains a need for methods and devices that would enable a simple and accurate evaluation of the status of various mechanical instruments, particularly surgical and dental instruments, prior to or during dental or surgical procedures that may be used by the clinician or his/her assistants.

SUMMARY OF THE INVENTION

The present invention provides devices and methods that enable the inspection of various mechanical instruments in order to determine their level of wear and re-usability. As used herein, "re-usability" refers to the suitability of a used instrument to be used again. For instruments for medical use, such as dental and surgical instruments, the term further encompasses the suitability of a used instrument to be used again in a manner that does not adversely affect the outcome of treatment or causes patient discomfort (for example bone heating, unnecessary tissue cuts and the like). According to embodiments of the present invention, the devices disclosed herein enable the inspection of used, worn mechanical instruments, in order to verify whether their wear exceeds an acceptable level which requires their replacement. The disclosed inspection device permits, in some embodiments, an automatic inspection of tools and provision of an indication regarding their re-usability. In some particular embodiments, the present invention provides devices and methods that enable the inspection of surgical and/or dental instruments, such as burrs, drills, hand drills, surgical scissors, dissecting forceps, hysterectomy clamps, bone levers, biopsy instruments, and optionally other instruments utilized in dental and/or surgical procedures. For example, scalers, curettes, periodontal probes, dental explorers, needle holders, trocars and chisels may be inspected by the devices and methods of the present invention. In addition, inspection of milling tools, ultrasonic/ piezo-electric scalers tips and the like may also be performed by using the devices and methods of the present invention.

According to one aspect, the present invention provides an inspection device for mechanical instruments, the device comprising:

one or more cameras configured to acquire an image of a mechanical instrument or a section thereof;

one or more illuminators configured to illuminate the mechanical instrument or a section thereof a processor configured to trigger the one or more illuminators, receive the image from the one or more cameras and compute an output signal regarding the re-usability of the inspected mechanical instrument; and an indication unit configured to provide an indication to a user regarding the re-usability of the inspected mechanical instrument. In some embodiments, computing the output signal comprises detecting and extracting specific mechanical edges of the inspected mechanical instrument or the section thereof.

In some embodiments, computing the output signal further comprises:

applying an image edge detection algorithm to detect edges within the image;

selecting one or more image edges from the detected image edges, which represent mechanical cutting edges;

determining the level of wear of the one or more mechanical cutting edges; and based at least on the detected level of wear, providing an indication regarding the re-usability of the mechanical instrument.

In some embodiments, determining the level of wear of the one or more active cutting edges comprises:

applying contour assessment algorithms to measure parameters selected from continuity, roughness, width, uniformity or combinations thereof of an active cutting edges: and based at least on the measured parameters, providing an indication regarding the level of wear.

In some embodiments, computing the output signal further comprises:

applying a texture segmentation algorithm to the image to determine the level of wear of the mechanical instrument or a section thereof; and based at least on the detected level of wear, providing an indication regarding the re-usability of the mechanical instrument.

In some embodiments, computing the output signal further comprises:

measuring color variation along the image to determine an amount of residue contamination of the mechanical instrument or a section thereof; and based at least on the detected amount of residue contamination, providing an indication regarding the re-usability of the mechanical instrument.

In some embodiments, computing the output signal further comprises:

detecting a tip of the inspected instrument or the section thereof within the image:

extracting a profile of the detected tip:

comparing the extracted profile to a reference profile:

based at least on the comparison, determining the level of wear of the tip: and based at least on the detected level of wear, providing an indication regarding the re-usability of the mechanical instrument.

In some embodiments, the processor is configured to determine the type of the inspected instrument prior to computing an output signal regarding its re-usability.

In some embodiments, determining the type of the inspected instrument comprises determining the contour and/or level of granularity of the instrument or the section thereof.

In some embodiments, the processor is further configured to transmit the output signal regarding the re-usability of the inspected instrument to an inventory management system or software.

In some embodiments, computing the output signal comprises:

projecting light onto the contour of the inspected device or a section thereof;

measuring light-material interaction phenomena to determine the level of wear of the contour; and based at least on the detected level of wear, providing an indication regarding the re-usability of the mechanical instrument.

In some embodiments, said indication unit comprises a display unit.

In some embodiments, the indication provided by the indication unit comprises a score.

In some embodiments, the indication provided by the indication unit is a visual signal.

In some embodiments, the indication provided by the indication unit is an audible signal.

In some embodiments, the mechanical instrument is a dental instrument.

In some embodiments, the mechanical instrument is a surgical instrument.

According to another aspect, the present invention provides a method for inspecting mechanical instruments, the method comprising:

acquiring an image of the mechanical instrument or a section thereof using one or more cameras accompanied with one or more illuminators;

automatically setting the combination of cameras and illuminators by using an iterative multiple exposures process; and operating a processor configured to receive the image from the one or more cameras and compute an output signal regarding the re-usability of the inspected mechanical instrument.

These and further aspects and features of the present invention will become apparent from the figures, detailed description and claims which follow.

DETAILED DESCRIPTION OF THE INVENTION

Figure 1:
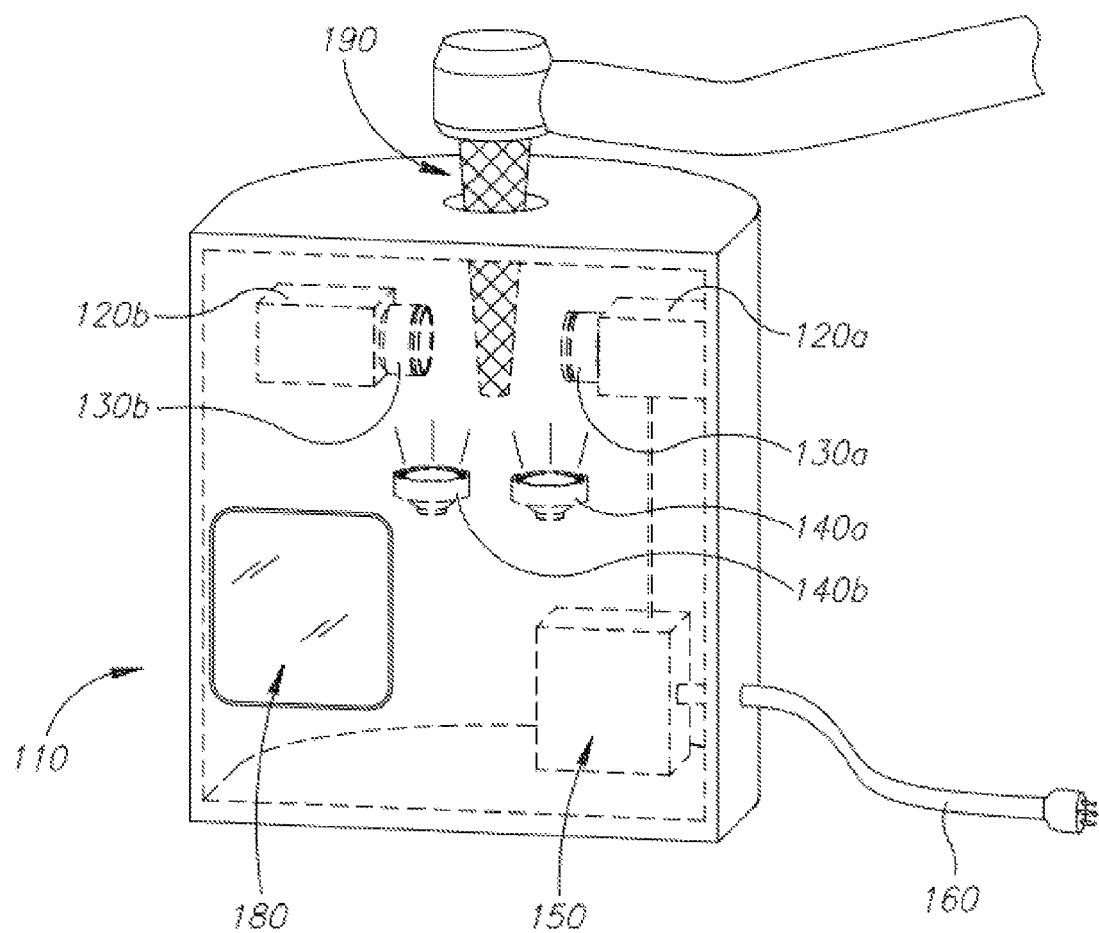
FIG. 1. A schematic illustration of an inspection device according to some embodiments of the present invention along with an inspected instrument.

The present invention is directed, in some embodiments, to methods and devices for the inspection of instruments used during clinical procedures, such as surgical and/or dental instruments. For example, dental burrs, dental drills and optionally other instruments utilized in dental procedures may be inspected.

For example, dentists commonly use handpieces that are adapted to receive dental drill bits, burs or other cutting instruments. In some embodiments, a simply operated detection and inspection device is provided, that can determine the level of wear of dental instruments. Such device may be useful, for example, for determining when a certain tool should be replaced.

According to some exemplary embodiments, by using an inspection device according to embodiments of the present invention, the clinical personnel and/or technicians and/or assistants will be able to evaluate the condition of the instrument and its drilling, polishing, cutting, holding, scraping and/or scaling efficiency, and to measure the level of wear of the instrument prior to or during operation. The clinical personnel may therefore decide in advance or during procedure whether it is possible to continue working with the instrument or whether the instrument should be replaced.

Such devices may be part of a dentist and patient unit, for example, a unit's tray that contains a dental drill. For example, in some embodiments, the device is part of the dental unit as an add-on device. The inspection device may also be a separate entity unit or part of a disinfection facility center or a stand-alone unit accessible by the assistant or the dentist for operation during or between therapy sessions. For example, in some embodiments, the device is part of a case cart unit in a SPD (Sterile Processing Department) and/or CSSD (Central Sterilized Supply Department. For example, in some embodiments, the device is part of OR accessible to technician and/or nurses and/or surgeons to inspect usability of instruments prior or during surgical and/or invasive and/or minimally invasive procedures.

Advantageously, the system according to some embodiments of the present invention provides an objective and repetitive indication or score (e.g. number) that identifies the tool and indicates the overall tool's functionality to perform its task.

In some embodiments, the quantitative result of the inspected tool can be transmitted, by wire or wireless connection, to a system or software that controls and manages a clinic's stock and purchasing, in order to save labor and assist in evaluating which new tools should be ordered as replacement for the damaged ones.

In some embodiments, the inspection device of the present invention has means to receive by wire or wireless communication a description of new tools being added to the inventory of a clinic and/or of the CSSD and/or of the OR and/or a surgical case. New tools may be inspected and sorted by using the inspection device of the present invention. In some embodiments, a display or screen, which may be part of the inspection device, gives an indication whether a tool to be inspected is part of a library of tools recognized by the device, prior to inspecting and displaying the grade of quality. In some embodiments, the inspection device of the present invention has means to receive by wire or wireless communication a description and name of the tools being inspected and following identification of instrument, to output an indication regarding the instrument's designated location, for example, within a particular surgical or in other location as required in SPD and/or CSSD and/or OR.

According to one aspect, the present invention provides an inspection device for mechanical instruments, the device comprising:

one or more cameras configured to acquire one or more images of a mechanical instrument or a section thereof;

a processor configured to receive an image from the one or more cameras and compute an output signal regarding the re-usability of the inspected instrument; and an indication unit configured to communicate the output signal to a user.

According to another aspect, the present invention provides a method for inspecting a mechanical instrument, the method comprising:

acquiring an image of the mechanical instrument or a section thereof using one or more cameras combined with one or more lenses and optionally one or more illuminators;

operating a processor configured to receive an image from the one or more cameras and compute an output signal regarding the re-usability of the inspected instrument.

In principle, the inspection may be performed using all optic modalities possible, including for example, laser and infrared techniques.

In some embodiments, one or more cameras are used for optically scanning the inspected instrument. Exemplary cameras include CCD, CMOS, line scanners, and photodiode sensors.

In some embodiments, the one or more cameras comprise at least one top view camera and least one side view camera. In some embodiments, a single side view camera is used to acquire multiple images of multiple viewing angels of an inspected instrument, by using, for example, a polygon mirror, which allows to obtain a plurality of viewing angles in a single image, or by using, for example, a step motor, which allows to capture multiple images at different viewing angles with a single camera.

In some embodiments, the cameras are stills. In other embodiments, video cameras are used.

In some embodiments, the processor is connected to a computer. In some embodiments, the processor is connected to a computer via wires. In other embodiments, the processor is connected to a computer via wireless connection In some embodiments, processing of the data is performed by an external computer. In other embodiments, data processing is performed by the inspection device itself.

In some embodiments, the output signal comprises an indication regarding specific segments of the inspected instrument which are worn. In some exemplary embodiments, an image of the inspected instrument in which the worn segments are marked is displayed by a display unit.

In some embodiments, the signal provided by the display unit is a visual signal. In alternative or additional embodiments, the signal is an audible signal.

In some embodiments, the unit is connected to the clinic management system that can affect stock indications and trigger events for purchasing new stock and providing reports on devices usability and quality Reference is now made to FIG. 1, which shows a schematic illustration of an inspection device according to some embodiments of the present invention along with an inspected instrument. A stand-alone system (110) inspecting a dental burr (190) is illustrated that includes two built-in cameras (120*a, b*), such as CCD or CMOS cameras, equipped with lenses (130*a, b*), and two illuminators (140*a, b*). The cameras are connected to a processor (150). The inspection device may further include a Random Access Memory (RAM, not shown), a non-transient memory (not shown). In some embodiments, the device comprises a processing unit which includes the processor, RAM and/or non-transient memory. The device may further include a computer connection and/or a wireless connection, for example, WiFi, Bluetooth or others. The illustrated inspection device comprises an indication unit comprising a display screen (180) that provides an indication to a user on the re-usability of the inspected tool. In some embodiments, the display screen provides an image of the inspected tool with an overlay indication of the tool's problem(s)/defects. The illustrated device further comprises a power cord (160). Typically, the processor receives an image from the cameras and starts an image processing procedure.

Figure 2:
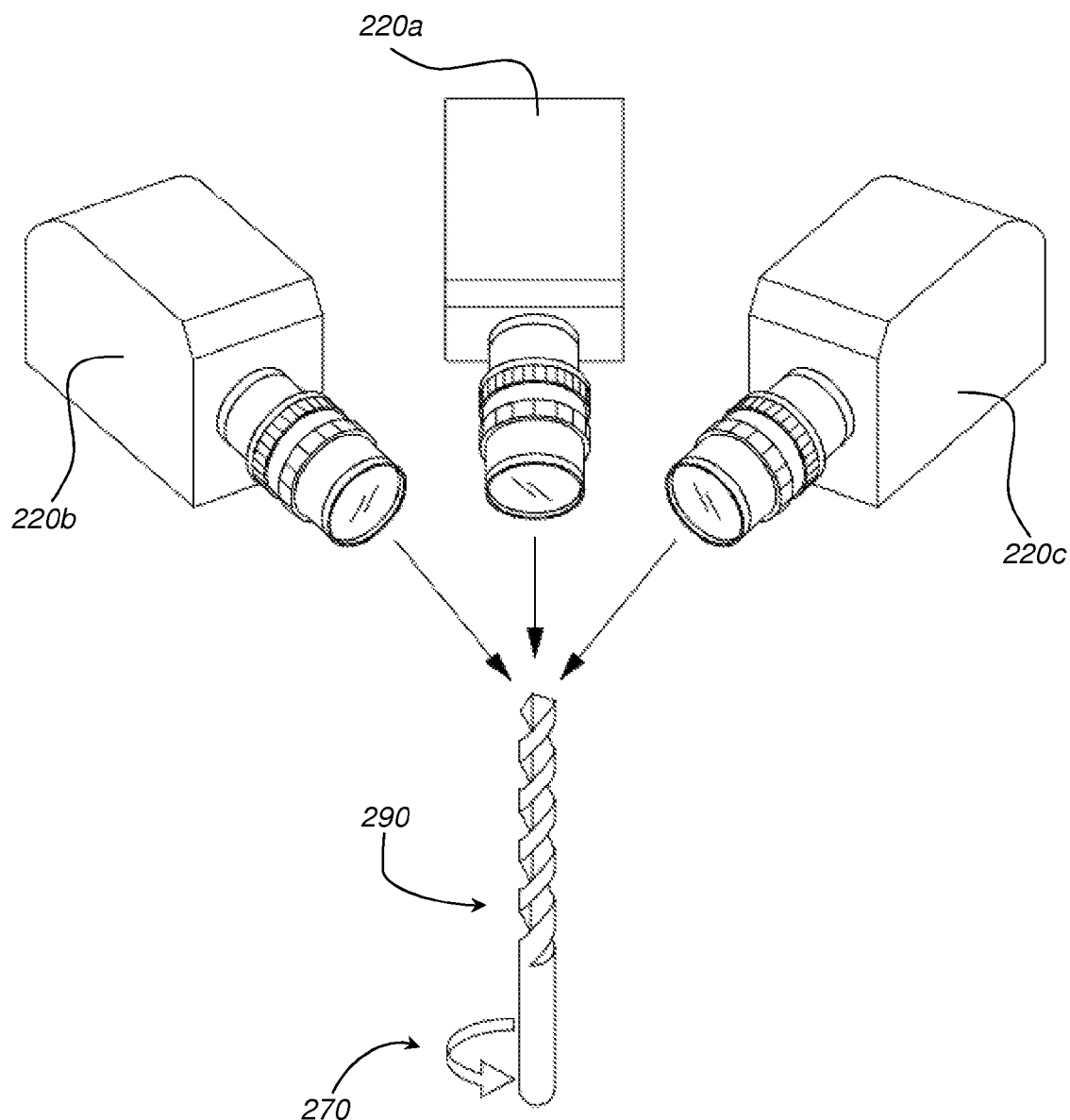
FIG. 2. A schematic illustration of an exemplary configuration of cameras within an inspection device according to some embodiments of the present invention.

Reference is now made to FIG. 2, which shows an exemplary configuration of cameras within an inspection device according to some embodiments of the present invention, for the inspection of a drill (290), including but not limited to, a dental drill. The illustrated configuration includes a top view camera (220*a*) and two side view cameras (220*b, c*). The configuration may further include one or more illuminators (not shown), for example two top view illuminators and two side view illuminators. The inspected drill may be mounted on a controlled rotation mechanism configured to rotate the inspected drill around its longitudinal axis (270). According to the principles of the present invention, the cameras acquire one or more images of the inspected drill or a portion thereof, which is transferred to a processor (not shown in this figure) for computing an output signal regarding the re-usability of the drill.

Figure 3:
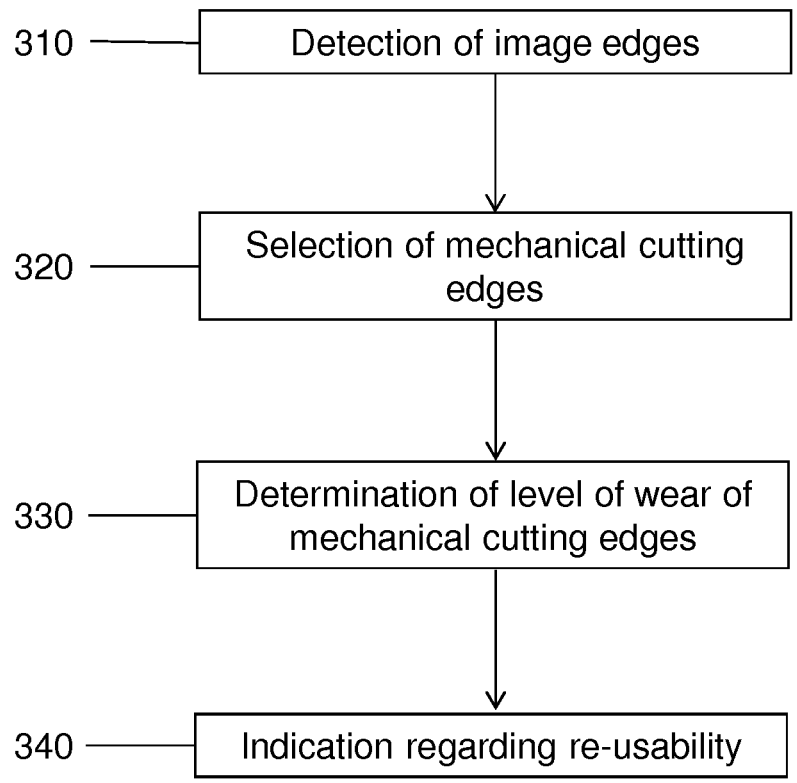
FIG. 3. A flowchart of steps for computing an output signal regarding the re-usability of a drill according to some embodiments of the present invention.
Figure 4:
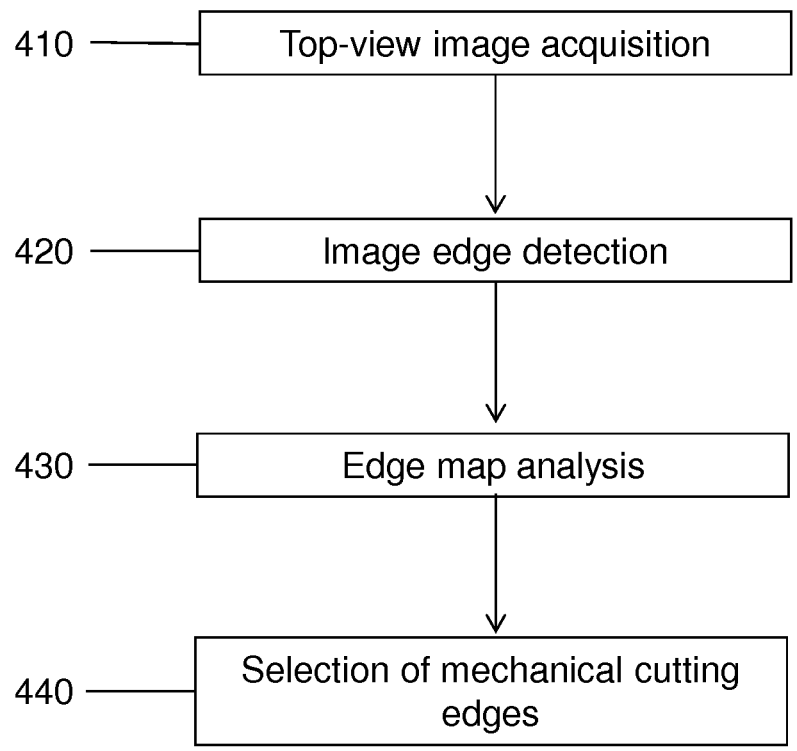
FIG. 4. A flowchart of steps for detecting one or more mechanical cutting edges out of image edges according to some embodiments of the present invention.
Figure 5:
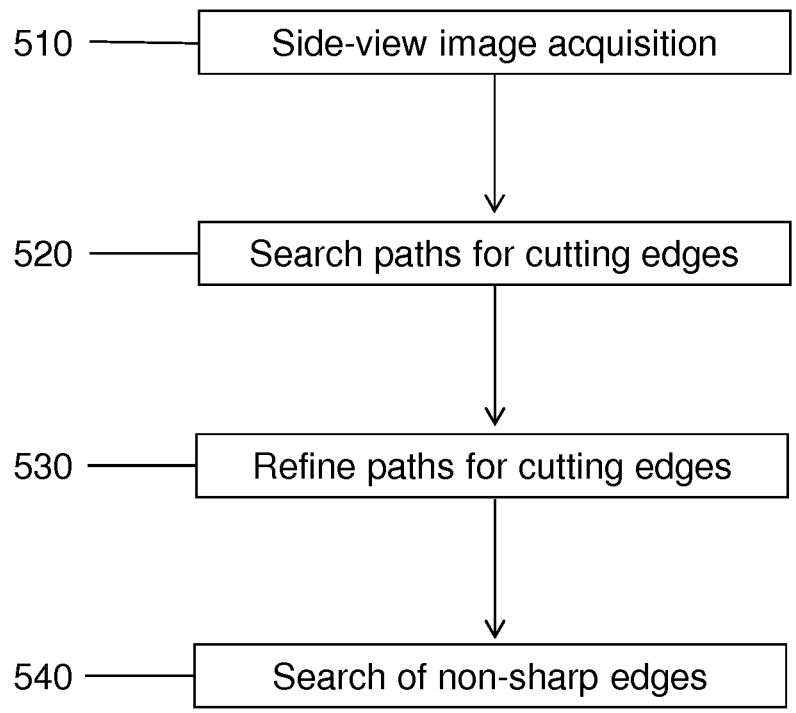
FIG. 5. A flowchart of steps for analysis of a side view image according to some embodiments of the present invention.

Reference is now made to FIGS. 3-5, which show flowcharts of steps for computing an output signal regarding the re-usability of the drill following image acquisition by the configuration of cameras presented in FIG. 2. On step (310), detection of edges within an acquired image (image edges) is performed by applying an edge detection algorithm to the image. As used herein, the term "image edges" refer to points along curves or lines within an image where the image brightness is discontinuous. Image edges typically correspond to boundaries between an object and the background, and discontinuities in the surface of an object. Image edges in the context of the present invention are caused, in some embodiments, due to strong reflections of light from dull mechanical edges illuminated by light sources specifically located perpendicular to a line tangent at the apex of the worn metal. Edge detection algorithms are well known in the art. For example, the simplest form of an edge detection algorithm searches local maximas in the $1^{st}$ derivative revealing strong discontinuities. A $2^{nd}$ derivative can be analyzed as well a search for zero crossing can be performed where edges occur.

The edge detection algorithm detects many edges within the image, however not all are relevant for inspection, as not all represent mechanical, cutting edges of the drill (the active cutting edges). On step (320), one or more edges from the detected image edges are selected, which represent mechanical cutting edges. On step (330), the level of wear of the one or more mechanical cutting edges is determined. In some embodiments, wear includes abrasion, scratches, scrapes, indentation, cavity or combinations thereof. On step (340), an indication regarding the re-usability is provided based at least on the detected level of wear. Typically, a level of wear above a pre-defined threshold will result in an indication that the drill is not re-usable.

Selection of one or more mechanical cutting edges for analysis of wear may be performed by a two-step process, combining data from top and side view images of the inspected drill.

First, top view images are acquired and analyzed in order to detect mechanical cutting edges, for example as described in FIG. 4 and will be detailed below.

Figure 12:
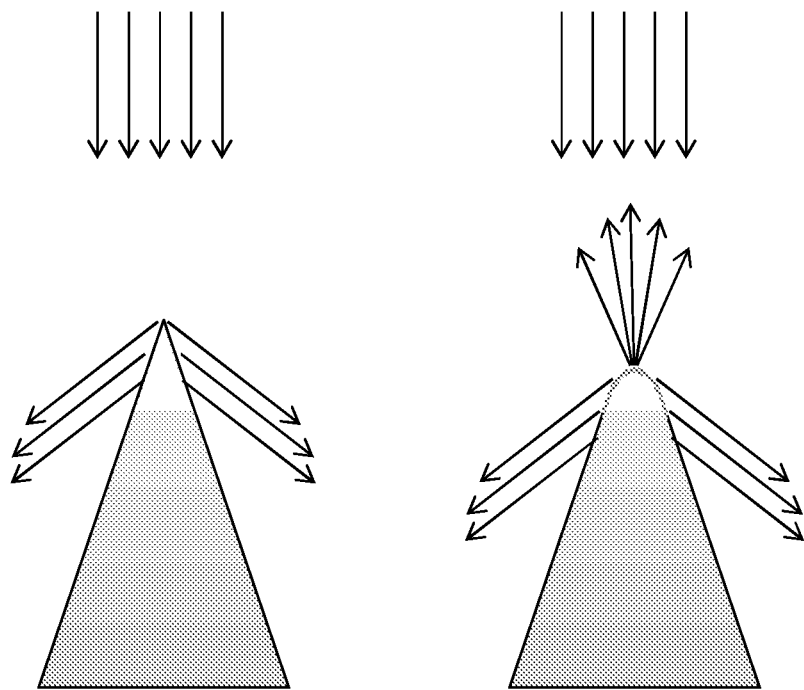
FIG. 12. A schematic illustration showing light propagation on a sharp versus dull edge with strong intensity reflected from dull edge.

Second, a collection of side view images are acquired and analyzed, from which those conveying best inspection information are selected. For example, side view images where an apex of the mechanical cutting edge is perpendicular to an illuminator may be selected. When a source of illumination is perpendicular to an apex of a worn edge, the reflection from a dull, non sharp edge is the largest. FIG. 12 shows light propagation on sharp (left) and dull (right) edge with strong intensity reflected from dull edge. In contrast, when the illumination source is perpendicular to a surface, a strong reflection will be obtained from a large surface rather than from dull edges. By analyzing top view images, the suitable side view images to be processed will be chosen such that the worn edge apex is perpendicular to an illuminating source. The mechanical cutting edges identified in the top view analysis are converted from the top view coordinate system into the side view image coordinate space, and paths are defined within the side view image where analysis of the edges is confined to. Thus, by combining data from the top and side view images, "synthetic paths" are determined, which correspond to areas within the image which will be analyzed in order to determine the level of wear. These paths correspond to areas in the image where the mechanical cutting edges are found. Analysis of the level of wear will be performed only for edges along these confined paths. The side view images are analyzed, for example, as described in FIG. 5 and will be detailed below.

An exemplary flowchart of steps for detecting one or more mechanical cutting edges out of image edges detected within a top view image of the drill is provided in FIG. 4. On step (410), a top-view image is acquired. Top view images are acquired by the corresponding cameras. On step (420) edge detection is applied to detect image edges. On step (430), an edge map analysis is performed to select only the edges relevant for inspection, by combining data acquired by the system for the drill under inspection, such as data about rotational symmetry, rotation direction, image labeling and edge connectivity. For example, the system may look at the symmetry of the drill and decides on the drill type and number of cutting edges (e.g., 2, 3, 4). Next the system, may find mechanical cutting edges corresponding to a cutting lip of the drill. In addition, the inspected drill rotates only in one direction, such as counterclockwise, thereby permitting to specify exactly the part of cutting edge needed for inspection. On step (440), mechanical cutting edges are selected based on the edge map analysis.

An exemplary flowchart of steps for analysis of a side view image is provided in FIG. 5. On step (510), a side-view image is acquired. Side view images are acquired by the corresponding cameras and their corresponding illuminators. On step (520) paths are identified where mechanical cutting edges are located, based on the data received from the top view image. On step (530), refinement of the paths where mechanical cutting edges are located is performed. Thus, on step (520) wider or more coarse paths may be defined, which are later one refined (on step 530) to narrower, more accurate paths, where actual cutting edges are found and should be inspected. On step (540), search of non-sharp edges is performed along the synthetic paths.

Upon the identification of mechanical cutting edges, their level of wear is determined In some embodiments, the level of wear comprises the level of sharpness. The level of sharpness may be determined based on the thickness of the identified cutting edges, where dull edges correspond to broad edges or to bright edges or to combinations thereof, and sharp edges correspond to narrow edges or to dark edges or to combinations thereof. In alternative or additional embodiments, the level of sharpness is determined based on intensity and uniformity of the edge. In some embodiments, contour assessment algorithms are applied, that measure continuity, roughness, width and/or uniformity of a mechanical cutting edge. In some embodiments, based at least on the combination of these edge measurements, an indication is provided regarding the level of wear.

In some embodiments, the processor utilizes a scoring system in order to determine the level of wear. In some embodiments, broader and brighter edges receive higher scores. Similarly, non-uniform edges receive a higher score, and identified scratches or other defects also receive higher scores. If the total score exceeds a certain threshold, the drill is identified as being un-reusable. Wherever the processor detects a defect, it labels it and adds it to a counter. If the total counts exceed a certain threshold, which is set by the system and or the user, the system designates the drill as defective and provides a signal to the indication unit.

In some embodiments, one or more of the following algorithms are applied: edge detection, 3D rotations of elements (such as edges or "paths") detected in 2D images, edge roughness estimation, contour assessment (continuity etc.), curve fitting and curve comparison, texture analysis (including for example uniformity of granularity, edge frequency), profile comparison.

Figure 6:
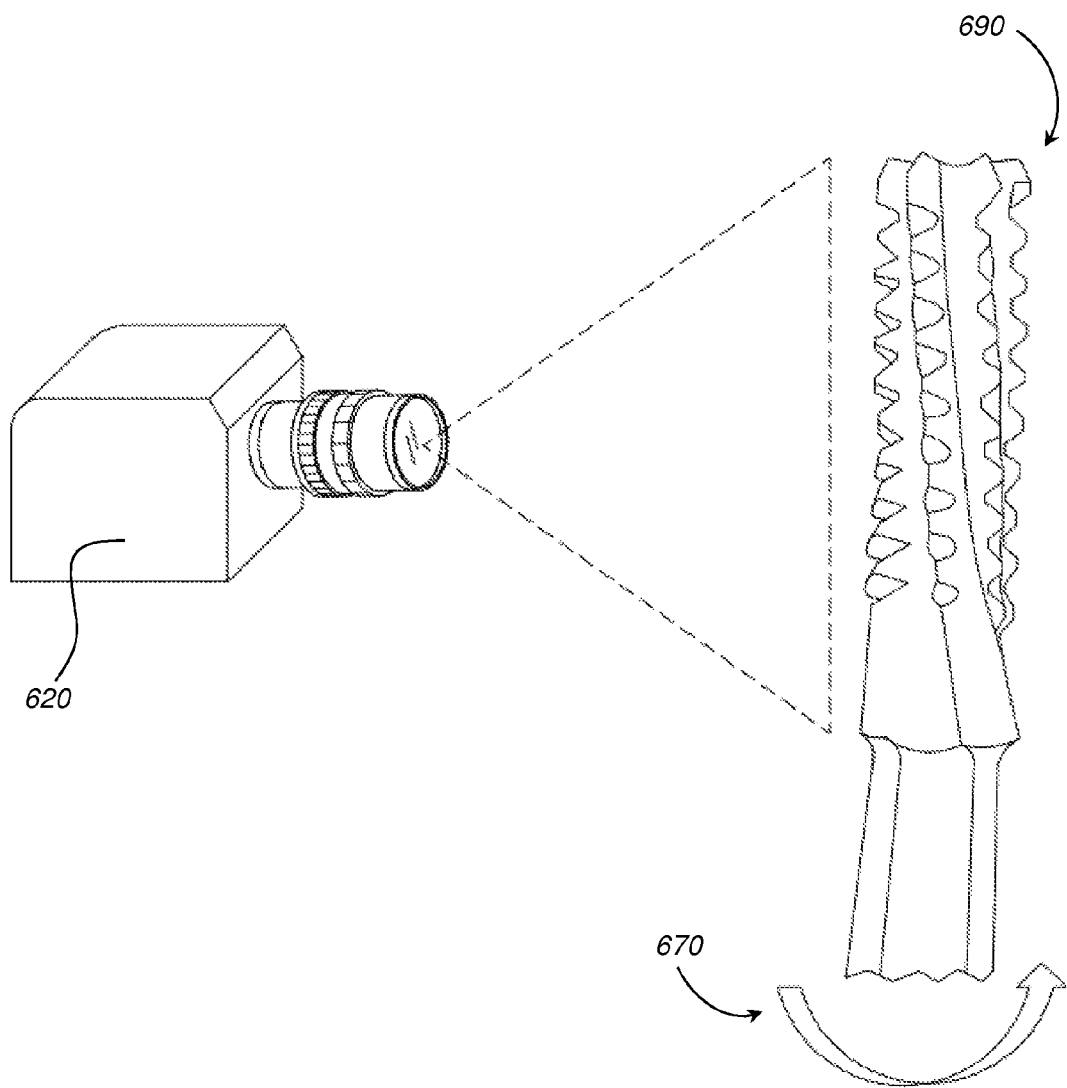
FIG. 6. A schematic illustration of an exemplary configuration of a camera within an inspection device according to some embodiments of the present invention.

Reference is now made to FIG. 6, which shows an exemplary configuration of a camera within an inspection device according to some embodiments of the present invention, for the inspection of a bun (690), including but not limited to, a dental bun such as carbide or tungsten bun. The illustrated configuration includes a side view camera (620). The inspected burr is mounted on a controlled rotation mechanism configured to rotate the inspected burr around its longitudinal axis (670). According to the principles of the present invention, the camera acquires one or more images of the inspected burr or a portion thereof, which is transferred to a processor (not shown in this figure) for computing an output signal regarding the re-usability of the bun. In the illustrated configuration, a single side view camera is used, perpendicular to the bun's longitudinal axis. The captured images cover 360° orientations of the serrated profile of the bun.

Figure 7:
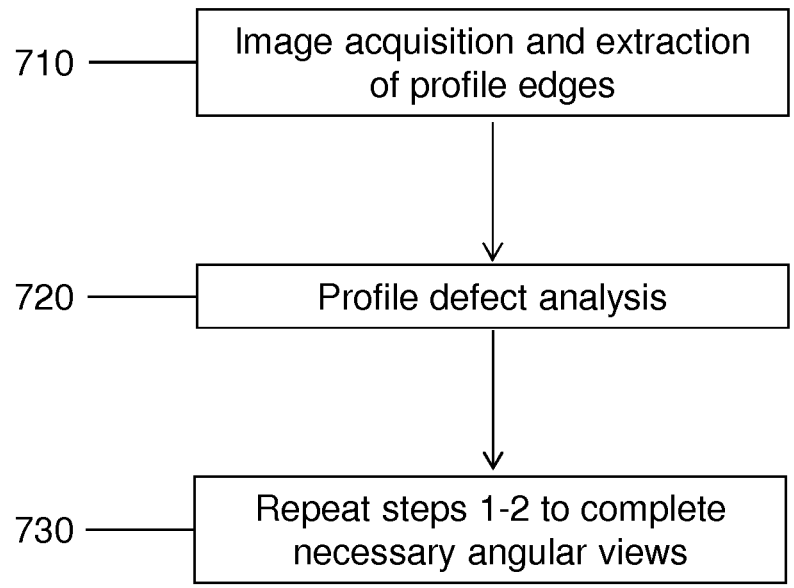
FIG. 7. A flowchart of steps for computing an output signal regarding the re-usability of a bun according to some embodiments of the present invention.

Reference is now made to FIG. 7, which shows a flowchart of steps for computing an output signal regarding the re-usability of the bun following image acquisition by the camera presented in FIG. 6. On step (710), an image is acquired and mechanical edges of the serrated profile of the burr, along the circumference of the burr, are extracted. On step (720), profile defect analysis is performed. In particular embodiments, an algorithm follows the contour of the serrated profile and detects defects such as breaks and abrasion. On step (730), previous steps 710 and 720 are repeated to complete necessary angular views.

In some embodiments, the output signal for an inspected bun comprises applying a contour following algorithm to follow the contour of the serrated profile and determine, according to its waviness, how close it is to an ideal sharp bun. In some embodiments, a threshold is assigned, and the processor is configured to provide an alert signal indicating a low level of sharpness.

In some embodiments, the inspected instrument does not contain one or more mechanical cutting edges, but is rather characterized by a rough, granular, external texture. Diamond burrs are a non-limiting example of such instruments.

In some embodiments, determination of the level of wear is performed based at least on analysis of the texture. A Fourier analysis could be applied to examine the frequency components of the profile. According to this analysis, reduction of certain spatial frequencies can provide an indication e on the amount of burr wear.

In some embodiments, the processor is configured to compute an output signal based on the uniformity of the granularity of the inspected instrument. In some embodiments, the uniformity of the granularity of the inspected instrument is measured throughout a segmented area, and lack of uniformity of granularity above a certain threshold is indicative of the inspected instrument being defective. In some embodiments, the uniformity of the granularity of the burr is measured all over the segmented area. Wherever the system detects that the uniformity is lacking, it labels it and adds it to a counter. If the total counts of lack of granularity exceed a certain threshold, which is set by the system and or the operator, the system designates the burr as defective and provides a signal to the indication unit.

In some embodiments, computing an output signal based on the level of granularity of the inspected instrument comprises applying a texture segmentation algorithm. In some exemplary embodiments, texture segmentation is performed using an edge frequency based texture analysis.

A non-limiting example of texture segmentation algorithm that may be used to discern different surfaces is edge frequency based texture analysis (see, for example, Srinivasan and Shobha (2008) *Proc. Of World Academy of Science Engineering and Tech.*, vol. 36, pp. 1264-1269). In this algorithm, the total length of all the edges in a region in the acquired image is used as a measure of the coarseness or complexity of a texture. Edges can be detected either as micro edges using small edge operator masks or as micro edges using large edge convolution masks. Operators like Robert's operator or Sobel's operator can be used for this purpose. The distance dependent texture description function $g(d)$ can be computed for any sub-image f defined in a neighborhood N for a variable distance d is $$g(d)=|F0-F1|+|F0-F2|+|F0-F3|+|F0-F4|$$

Where $F0=f(i,j)$, $F1=f(i+d, j)$
$F2=f(i-d, j)$, $F3=f(i,j+d)$ and
$F4=f(i,j-d)$ Different values of $g(d)$ in the various parts of the instrument's image provide a differentiator between existence or none existence of diamonds coating on the burr, or the roughness of the material such as Tungsten or Carbide of the bun. From the function $g(d)$ the granularity of the surface can be deduced.

In alternative or additional embodiments, the processor is configured to compute an output signal based on the amount of residue contamination on the inspected instrument. In some embodiments, the amount of color variation along the inspected instrument is measured, and the processor performs segmentation of foreign material, such as resin, tooth residue and/or acryl. Thus, in some embodiments, the processor is configured to measure the amount of color variation along the inspected instrument and segment foreign material.

Figure 8:
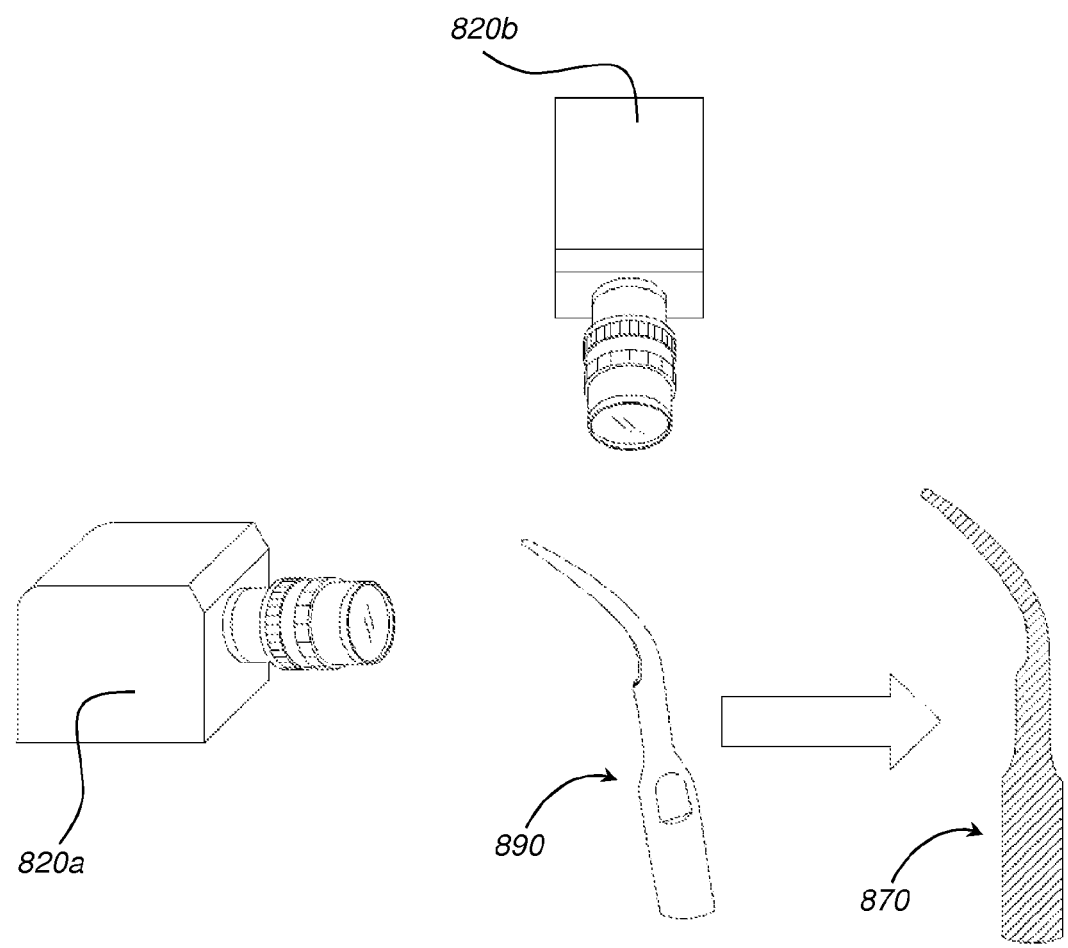
FIG. 8. A schematic illustration of an exemplary configuration of cameras within an inspection device according to some embodiments of the present invention.

Reference is now made to FIG. 8, which shows an exemplary configuration of cameras within an inspection device according to some embodiments of the present invention, for the inspection of a dental scaler (890). The illustrated configuration includes a top view camera (820a) and a side view camera (820b).

Figure 9:
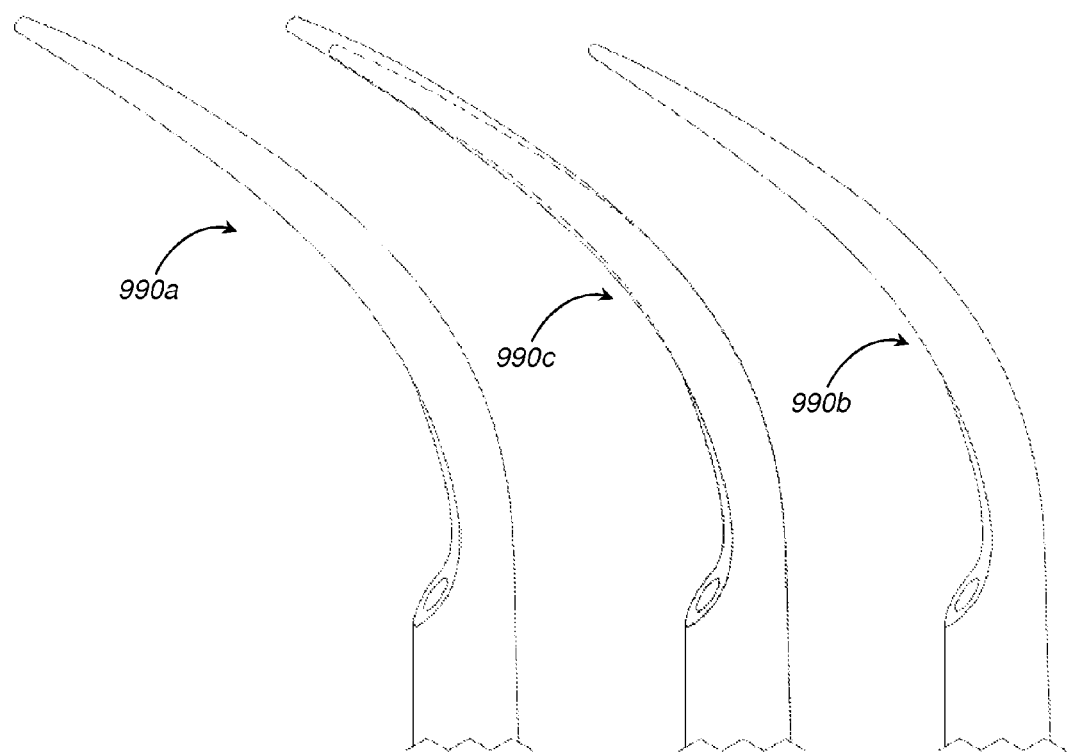
FIG. 9. A schematic illustration of tip analysis according to some embodiments of the present invention.

In some embodiments, evaluation of a scaler comprises evaluation of the length, shape and bend angle of the tip, collectively referred to as the profile of the tip. A worn tip is typically shorter, narrower and/or distorted in comparison to a new tip of the same type. According to embodiments of the present invention, the profile of a tip of an inspected scaler is compared to a predefined, reference profile of an un-used, un-damaged tip of the same type, at an exact orientation. The conformity of the inspected profile to a normal reference profile is evaluated. As shown in FIG. 9, by overlaying the two profiles, it is possible to detect changes in the scaler's tip that are indicative of the scaler being defective.

As the scaler is inserted into the inspection device in an unknown orientation within the 3D space, a preliminary step of the analysis includes the determination of orientation and creation of a normalized profile at a standard orientation based on images received from a dual camera setup, such as the setup shown in FIG. 8. Images captured by the two cameras are processed and transformed into a desired 3D standard orientation suitable for measurement (870).

Figure 10:
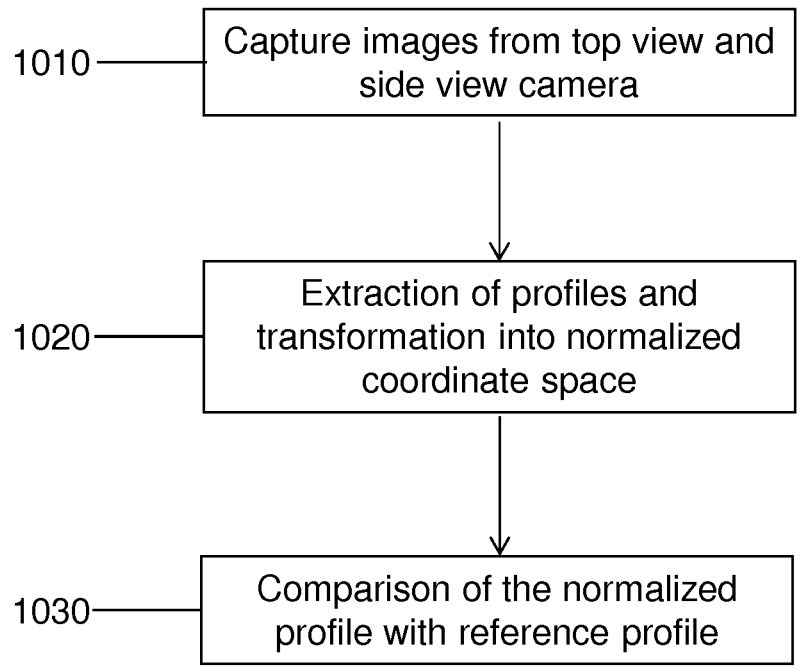
FIG. 10. A flowchart of steps for computing an output signal regarding the re-usability of a scaler according to some embodiments of the present invention.

Reference is now made to FIG. 10, which shows a flowchart of steps for computing an output signal regarding the re-usability of the scaler based on images received from the configuration of cameras presented in FIG. 8. On step (1010), images are captured from the top view and side view cameras. On step (1020), profiles of the inspected tip is extracted and transformed into a normalized coordinate space, therey creating a normalized profile in a desired 3D orientation. On step (1030), the normalized profile is compared with a reference profile. Differences above a predefined threshold are indicative of the scaler being defective and nor re-usable.

In some embodiments, inspection of a dental scaler is performed using side view cameras (without a top view camera). According to these embodiments, the cameras should be perpendicular to the plane of the scaler—capturing a silhouette image. In some embodiments, this is accomplished by rotating the scaler and selecting the best image. In alternative embodiments, two side-view cameras at orthogonal positions are used, and the scaler is inspected using at least two side-view images.

In some embodiments, the inspection device comprises one or more illuminators. Illuminators may include a one or more of: (1) illumination at different projection angles, (2) illumination of different spectral responses, (3) illumination of different coherence characteristics, and (4) different radiation pattern. The illuminating sources could be switched on/off at various combinations with a camera to produce one or more images of the same viewing angle that can be later analyzed either in a fused/non-fused manner. This may increase the desired signal from an area of interest within the inspected instrument or section thereof, and decrease reflections from unwanted areas.

In some embodiments, computing the output signal comprises: projecting light onto the contour of the inspected device or a section thereof; measuring light-material interaction phenomena to determine the level of wear of the contour; and based at least on the detected level of wear, providing an indication regarding the re-usability of the mechanical instrument.

In some embodiments, coherent light sources (such as laser) may be projected at the contour of the tool, and speckles and/or other optical phenomena may provide indication regarding tip and edge sharpness. In some embodiments, speckles and/or diffraction pattern reflected from a tip or edge of the knife are analyzed to determine the quality and disparity from ideal tip or edge.

Examples of other illuminators include light-emitting diodes (LED), light bulbs, compact fluorescent lamp (CFL) and diffusive luminescence sheets. The different light sources may be combined with diffusers to achieve more uniform light distribution.

In some embodiments, prior to beginning of processing and computation of an output signal by the processor of the inspection device, the user gives an indication regarding the type of instrument being inspected through a user interface unit. Thus, in some embodiments, the inspection device further comprises a user interface unit configured to receive an indication from a user regarding the type of instrument being inspected. The interface unit may also be configured to receive additional data from the user, or to enable the user to change parameters regarding the computation of output signals and the like. The interface may also indicate size of instrument or serial number and/or the intended use of the instrument. For example: mayo scissors 180 mm which are placed in a cesarean section kit.

In some embodiments, the processor is configured to determine the type of the inspected instrument prior to computing an output signal regarding its re-usability. In some embodiments, determining the type of the inspected instrument comprises determining the contour and/or level of granularity of the instrument or a section thereof. In some embodiments, a texture segmentation algorithm is applied in order to verify the level of granularity of the instrument or a section thereof.

In some embodiments, the processor is further configured to transmit the output signal. In some embodiments, the output signal is transmitted to a software. For example the output signal may be transmitted to an inventory management software.

In some embodiments the output signal indicates the instruments' serial number. The output signal may be transmitted to an inventory list for sorting surgical kits.

Figure 11:
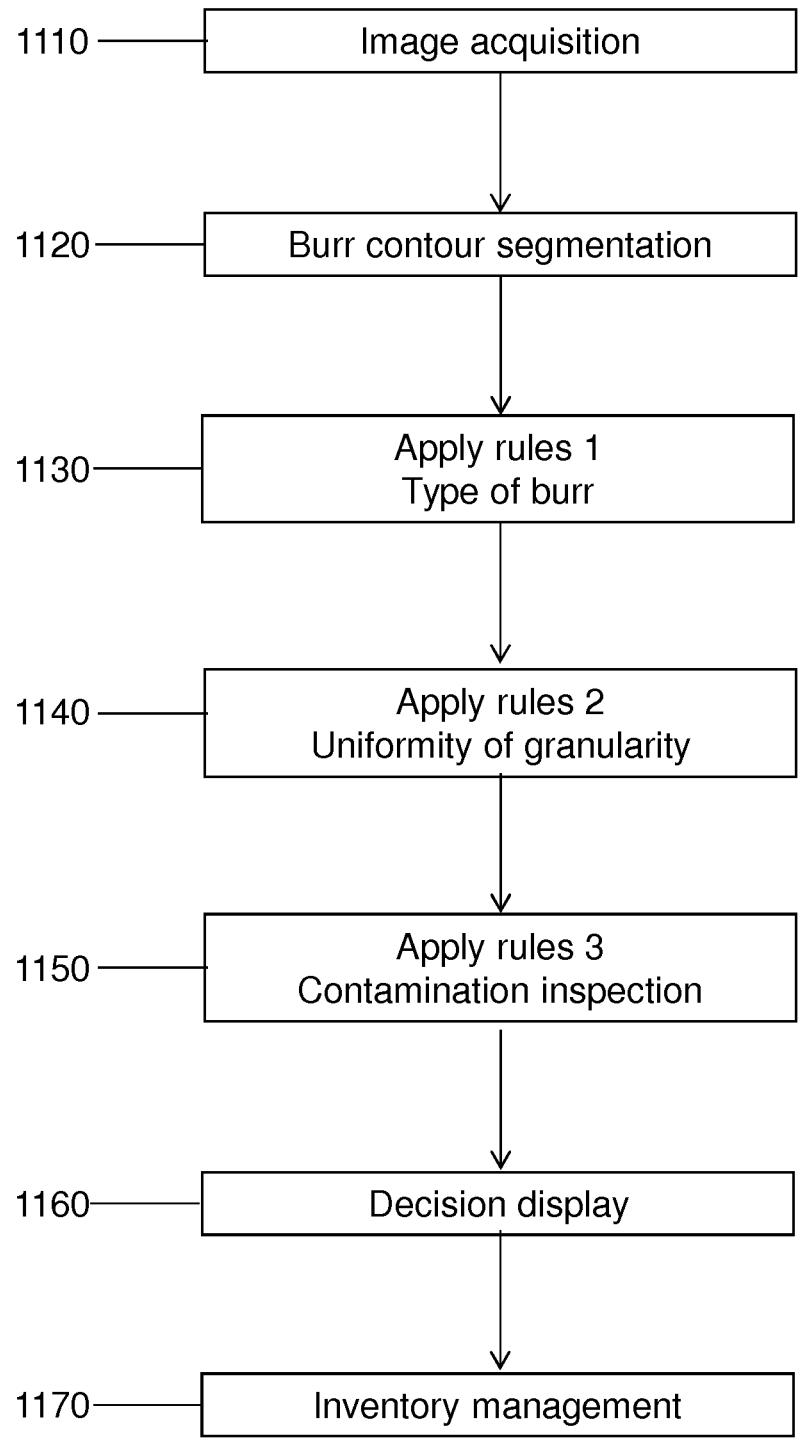
FIG. 11. A flowchart of steps for in a procedure for image processing by an inspection device according to some embodiments of the present invention.

Reference is now made to FIG. 11, which shows an exemplary flowchart of steps in a procedure for image processing by an inspection device according to some embodiments of the present invention, for example, image processing of an inspected bun. On step (1110), the image is acquired. On step (1120), a contour segmentation algorithm is applied in order to extract the image of the burr, from its background. On step (1130), the first rule of texture density is applied which automatically verifies the level of granularity of the burr, and together with the general contour of the bun, the type of the bun is set. On step (1140), the uniformity of the granularity of the bun is measured all over the segmented area. Wherever the algorithm/system detects that the uniformity is lacking, it labels it and adds it to a counter. If the total counts of lack of granularity exceed a certain threshold, which is set by the system and or the operator, the system designates the bun as defective and provides a signal to the display.

Optionally, the procedure comprises a further step (1150), which is designated to count the amount of residue contamination. On step (1150), the system checks the amount of color variation and does segmentation of foreign material, such as resin, tooth residue and/or acryl.

On step (1160), the total counts of quality are averaged and compared against a threshold which leads to a decision making. On step (1170), a stock management procedure determines whether to notify the user to replace and order a burr replacement.

The device and method of the present invention may be utilized to evaluate the cutting efficiency of hand instruments, for example dental scalers and/or surgical scissors. The device and method of the present invention may be utilized for checking the sharpness of dental instruments such as scalers, curettes, dental burrs and/or implant drills.

The device and method of the present invention may be utilized to evaluate the degree of serration in saws, dissectors, needle holders and other dental or surgical instruments.

The device and method of the present invention may be utilized to inspect the quality of a variety of dental drills, including diamond, tungsten, carbide, zircon oxide and plastic drills. The device may also be utilized to inspect the quality of dental CAD/CAM (computer-aided design and computer-aided manufacturing) drilling and grinding tools, for example, diamond cutters that constitute the milling machine of crown and bridge work.

In some embodiments, instruments to be inspected include dental burrs, implant drills, scalers, probes and ultrasonic/piezo-electric scalers tips, surgical scissors; mayo scissors, matzenbaum scissors, tenotomy scissors, dissecting forceps, needle holders, wound retractors, hysterectomy clamps, bulldog clamps, bone levers, chisels, hand drills, awls, bone rongeurs, bone cutting forceps, uterine probes, biopsy instruments, trocars, genito-urinary instruments, curettes, haemostatic forceps, and uses thereof.

The device and method of the present invention may be utilized to inspect the quality of ultrasonic scaler tips and dental piezo electric tips.

The device and method of the present invention may be utilized to inspect the quality of dental explorers.

The device and method of the present invention may be utilized to inspect a variety of dental and/or surgical instruments, including but not limited to, dental milling tools, drill instruments, cutters, knives, probes, polishing and trimming discs (including plastic, metal and diamond covered discs) solid carbide dental endmills, tangential milling system, plungers for deep cavity, slitting and slotting cutters, cutters with helical/curved cutting edge, fan blades, compressor blades and vanes, turbine blades and vanes.

Additional examples of reusable surgical tools that may be inspected by the device and method of the present invention include: forceps, scissors, knives, shears, chisels, osteotomes, curettes, gouges, saws, files, rasps, drills, burrs, kuentscher and trocars.

Figure 13:
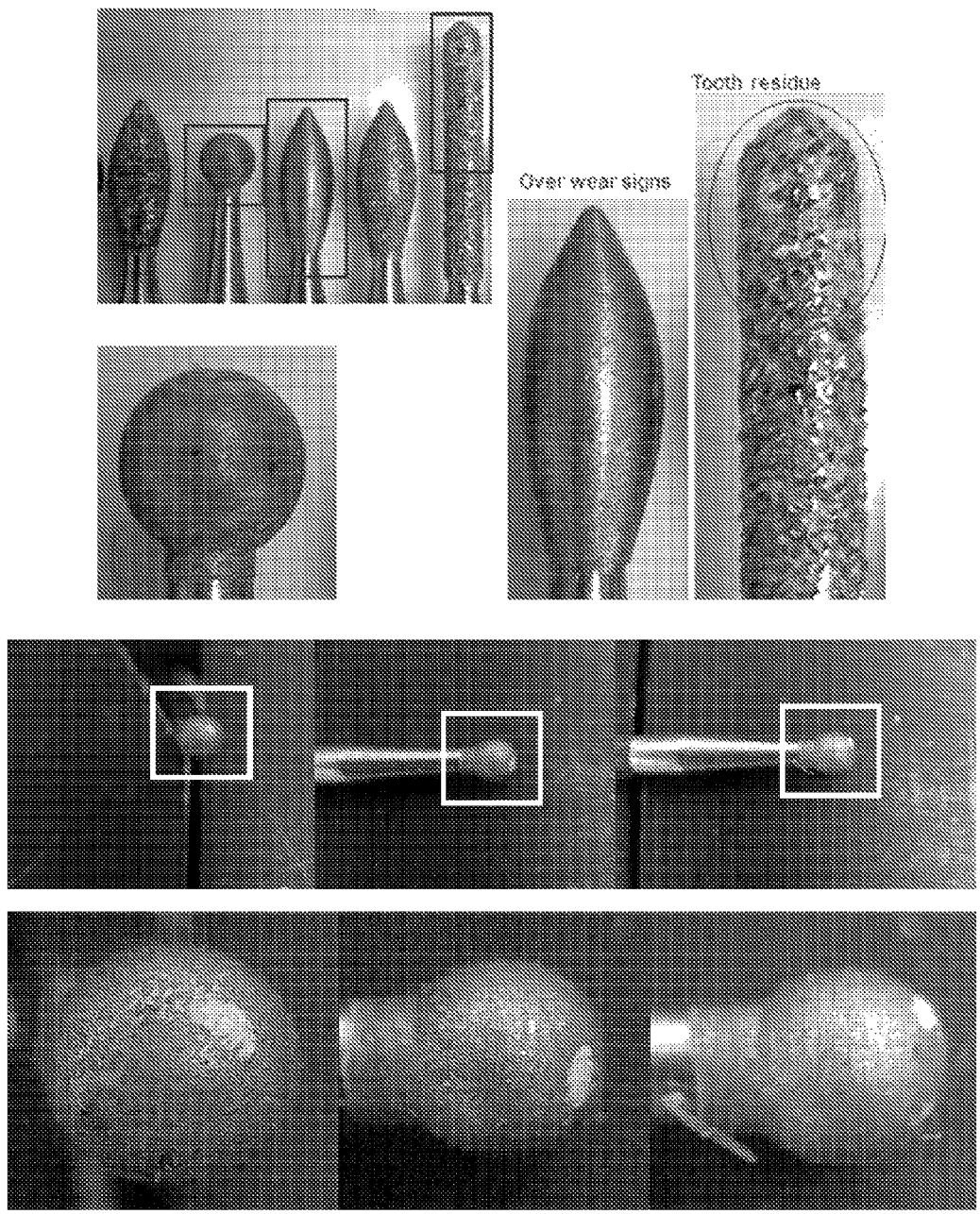
FIG. 13. Exemplary dental instruments which are suitable for inspection by the device of the present invention, showing wear sings such as white stain, rust stain, metal ablation, residue contamination (such as tooth contamination).

Exemplary dental instruments which are suitable for inspection by the device of the present invention, showing wear sings such as white stain, rust stain, metal ablation, residue contamination (such as tooth contamination) are shown in FIG. 13.

Figure 14:
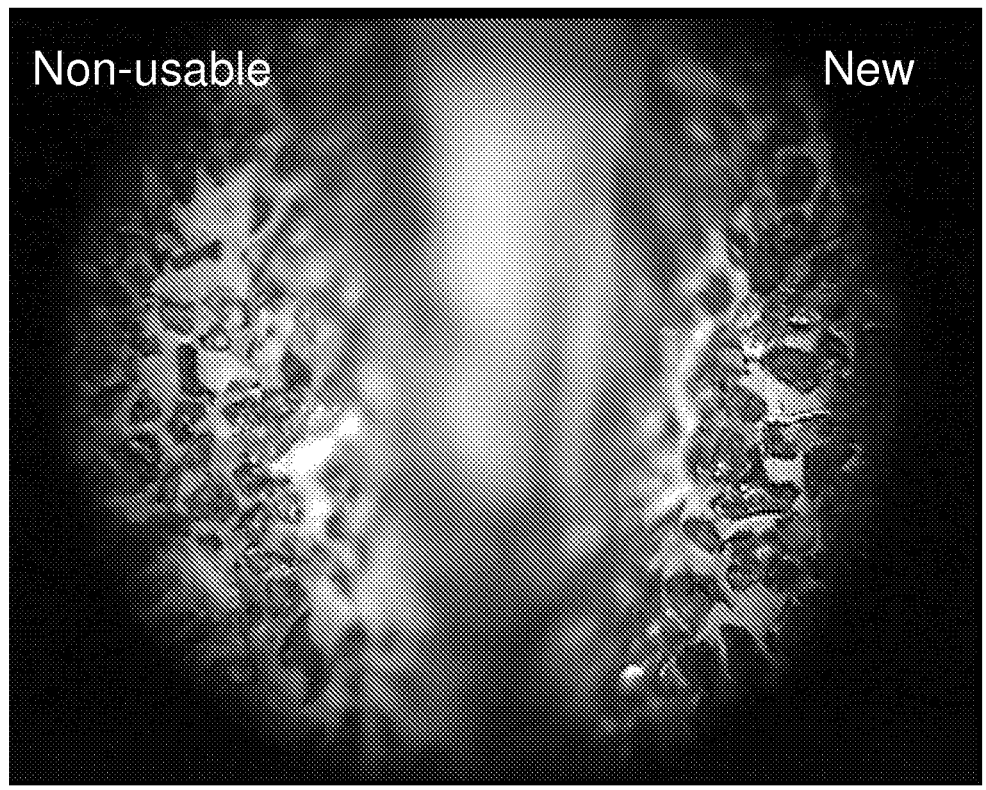
FIG. 14. A top view of a worn (left) versus new (right) dental diamond bun.

A top view of a worn (left) versus new (right) dental diamond bun is shown in FIG. 14.

Figure 15:
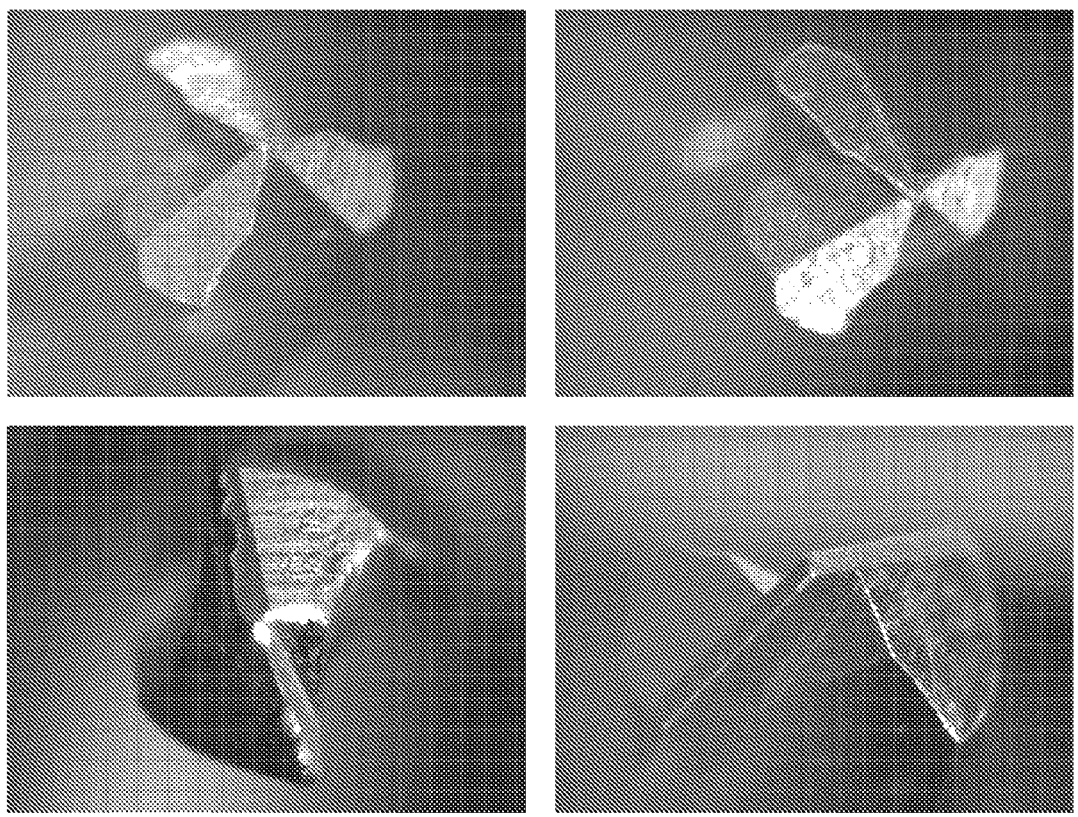
FIG. 15. A top view of worn (left) versus new (right) dental drills.

A top view of worn (left) versus new (right) dental drills is shown in FIG. 15.

In some embodiments, the processor is configured to compare the scanned data to that of a standard new instrument, and analyze the difference between the standard instrument and the inspected instrument. In some embodiments, software is used, that compares the scanned data to that of a standard new instrument, and analyzes the difference between the standard instrument and a measured instrument.

In some embodiments, the device is capable of identifying the instrument, for example, a certain drill, thus the operator will be able to calculate the time span the drill is in use (if measured).

Data received from the scanning may be utilized by common types of inventory management software and will able to track and order dental burrs. Data received from the scanning may be utilized to identity surgical instruments for assembly of surgical sets. Data received from scanning may be utilized for traceability of surgical instruments (frequency of use, sterilization, repair, storage, event history etc.)

Further features:
1. A scoring system may be used to define the level of wear of tools between 1-10, and/or usable vs. unusable. Scoring may be displayed by LEDs and/or on screen. Scoring may be indicated by a change in the color of the LED. Each score/indication may be represented by a dedicated color. Thresholds to each grade may be calibrated by end user standards or by standards required by regulatory bodies.
2. When an instrument is inserted into the device the screen may indicate name, size and type of the instrument. Dental Diamond Burrs, Dental Carbide Buns, Scalers, Mayo Scissors, Matsenbaum Scissors, Tenotomy Scissors, Rongeurs, Curettes, Osteotomes, Drill bits, Rasps, Trocars, Drills, Dermatomes, Hemostats and more.
3. When the device decides that an instrument is in poor quality and unusable, the device may send an alert to a stock management software requesting a new order of the identified instrument.
4. In the case of dental instruments, the device may be integrated within a dental chair or as a standalone system. Integration may be applicable to all commercial chairs.
5. An update button may be included, which enables to add a new tool that to the instrument library stored within the device. New tool will be added to the inventory list.
6. Manual inspection button may be included, which enables to perform manual inspection if necessary.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

What we claim is:

1. An inspection device for mechanical instruments, the inspection device comprising:
   (i) one or more cameras configured to acquire an image of a mechanical instrument or a section thereof;
   (ii) one or more illuminators configured to illuminate the mechanical instrument or a section thereof;
   (iii) a processor configured to trigger the one or more illuminators, receive the image from the one or more cameras and compute an output signal regarding the type of the inspected mechanical instrument; and
   (iv) an inventory management system or software for sorting said inspected mechanical instruments based at least on the output signal provided by the processor,
   wherein computing the output signal further comprises:
      applying an image edge detection algorithm to detect edges within the image;
      selecting one or more image edges from the detected image edges, which represent mechanical cutting edges;
      determining a level of wear of the one or more mechanical cutting edges; and
      based at least on the detected level of wear, providing an indication regarding re-usability of the mechanical instrument wherein computing the output signal further comprises: applying a texture segmentation algorithm to the image to determine the level of wear of the mechanical instrument or a section thereof; and based at least on the detected level of wear, providing an indication regarding re-usability of the mechanical instrument; measuring color variation along the image to determine an amount of residue contamination of the mechanical instrument or a section thereof; and based at least on the detected amount of residue contamination, providing an indication regarding re-usability of the mechanical instrument.

2. The inspection device of claim 1, wherein computing the output signal comprises detecting and extracting specific mechanical edges of the inspected mechanical instrument or the section thereof.

3. The inspection device of claim 1, wherein determining the level of wear of the one or more active cutting edges comprises:
   applying contour assessment algorithms to measure parameters selected from continuity, roughness, width, uniformity or combinations thereof of an active cutting edges: and
   based at least on the measured parameters, providing an indication regarding the level of wear.

4. The inspection device of claim 1, wherein computing the output signal further comprises:
   detecting a tip of the inspected instrument or the section thereof within the image:
   extracting a profile of the detected tip:
   comparing the extracted profile to a reference profile:
   based at least on the comparison, determining the level of wear of the tip: and
   based at least on the detected level of wear, providing an indication regarding re-usability of the mechanical instrument.

5. The inspection device of claim 1, wherein computing the output signal comprises:
   projecting light onto the contour of the inspected device or a section thereof; measuring light-material interaction phenomena to determine the level of wear of the contour; and
   based at least on the detected level of wear, providing an indication regarding re-usability of the mechanical instrument.

6. The inspection device of claim 1, further comprising a display unit.

7. The inspection device of claim 1, wherein the mechanical instrument is a dental instrument.

8. The inspection device of claim 1, wherein the mechanical instrument is a surgical instrument.

9. The inspection device of claim 1, wherein said processor is further configured to receive by wire or wireless communication a description of new tools being added to an inventory of a clinic and/or of a Sterile Processing Department (SPD) and/or of a Central Sterilized Supply Department (CSSD) and/or of an Operating Room (OR) and/or a surgical case, and to sort said inspected mechanical instruments according to said received description.

10. The inspection device of claim 1, wherein said processor is further configured to output an indication regarding said instrument's designated location within a particular surgical kit and/or in an SPD and/or a CSSD and/or an OR.

11. The inspection device of claim 1, wherein said provided indication is a serial number of said inspected mechanical instrument.

12. The inspection device of claim 1, further comprising an indication unit configured to provide an indication regarding the re-usability of said inspected mechanical instrument.

13. The inspection device of claim 12, wherein the indication provided by the indication unit comprises a score.

14. The inspection device of claim 12, wherein the indication provided by the indication unit is a visual signal.

15. The inspection device of claim 12, wherein the indication provided by the indication unit is an audible signal.

16. A method for inspecting mechanical instruments, the method comprising:
   (i) acquiring an image of the mechanical instrument or a section thereof using one or more cameras accompanied with one or more illuminators;
   (ii) automatically setting the combination of cameras and illuminators by using an iterative multiple exposures process;
   (iii) operating a processor configured to receive the image from the one or more cameras and compute an output signal regarding the type of the inspected mechanical instrument; and
   (iv) sorting inspected mechanical instruments, using an inventory management system or software, based at least on the signal provided by the processor;
   wherein computing the output signal further comprises:
   applying an image edge detection algorithm to detect edges within the image;
   selecting one or more image edges from the detected image edges, which represent mechanical cutting edges;
   determining a level of wear of the one or more mechanical cutting edges; and
   based at least on the detected level of wear, providing an indication regarding re-usability of the mechanical instrument wherein computing the output signal further comprises: applying a texture segmentation algorithm to the image to determine the level of wear of the mechanical instrument or a section thereof; and based at least on the detected level of wear, providing an indication regarding re-usability of the mechanical instrument; measuring color variation along the image to determine an amount of residue contamination of the mechanical instrument or a section thereof; and based at least on the detected amount of residue contamination, providing an indication regarding re-usability of the mechanical instrument.

* * * * *